United States Patent [19]

Harris et al.

[11] 3,855,357
[45] Dec. 17, 1974

[54] WIRE AND CABLE INSULATION COMPRISING VINYL CHLORIDEPOLYMER AND LACTONE GRAFT COPOLYMER

[75] Inventors: Edward B. Harris, Spring Valley, N.Y.; David B. Braun, Ridgefield, Conn.

[73] Assignee: Union Carbide Corporation, New York, N.Y.

[22] Filed: Aug. 3, 1973

[21] Appl. No.: 385,303

[52] U.S. Cl. ... 260/897 C, 260/23 XA, 260/31.8 M, 260/33.6 UA, 260/45.75 R, 260/874, 260/876, 260/899, 260/901
[51] Int. Cl. ............................................. C08f 29/24
[58] Field of Search ..................... 260/897, 899, 874

[56] References Cited
UNITED STATES PATENTS

| | | | |
|---|---|---|---|
| 3,562,360 | 2/1971 | King et al. | 260/898 |
| 3,592,877 | 7/1971 | Mullins | 260/874 |
| 3,760,034 | 9/1973 | Critchfield et al. | 260/899 X |

Primary Examiner—Murray Tillman
Assistant Examiner—C. J. Seccuro
Attorney, Agent, or Firm—Bernard Francis Crowe

[57] ABSTRACT

Wire and cable insulation having improved abrasion, oil and solvent resistance has been prepared from vinyl chloride polymer/lactone graft copolymer blends.

10 Claims, No Drawings

3,855,357

WIRE AND CABLE INSULATION COMPRISING VINYL CHLORIDEPOLYMER AND LACTONE GRAFT COPOLYMER

BACKGROUND OF THE INVENTION

This invention pertains to wire and cable insulation and in particular to vinyl chloride polymer insulation compositions containing lactons graft copolymer plasticizer.

Vinyl chloride polymers have been used as electrical insulation for wire and cable use in the construction, appliance, automotive and communications industries. While such insulation has generally been satisfactory, it is not suitable for applications where severe mechanical abuse may be encountered during installation or use of wire or cable. In order to overcome this deficiency it has been necessary to extrude a jacket of nylon over vinyl chloride polymer insulation. The addition of the nylon jacket involves a two-step process for the production of insulated wire or cable, whether parallel or tandem extrusion lines are used. In the parallel extrusion line, vinyl chloride polymer insulation is first extruded over the conductor, cooled and wound on a reel. The reel is then moved to a second extrusion line where nylon is extruded over the vinyl chloride polymer insulated wire. IN the tandem line, vinyl chloride polymer insulation is first extruded over the conductor, then cooled and passed directly into the second extruder where the nylon jacket is placed over the insulated wire. Either procedure introduces additional problems of control, logistics and manpower with concomitant coat increases. Furthermore, the nylon jacket is several times more costly than the vinyl chloride polymer insulation.

SUMMARY OF THE INVENTION

It has now been found that a wire and cable insulation having enhanced abrasion, oil and solvent resistance is provided (without the necessity of adding a nylon jacket) which comprises a blend of:

1. a normally solid vinyl chloride polymer containing at least aboue 80 percent by weight of vinyl chloride monomer polymerized therein and from 0 percent to about 20 percent by weight of an ethylenically unsaturated comonomer capable of copolymerizing with vinyl chloride; and
2. about 40 to about 80 parts by weight per hundred parts of vinyl chloride polymer of a graft copolymer of a lactone having the formula:

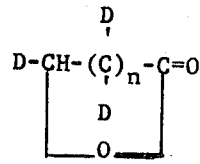

wherein $n$ is an integer having values of from about 3 to about 6 wherein at least $n + 2$ D's are hydrogen and wherein the remaining D's are lower alkyl groups having up to about 8 carbon atoms, said lactone being graft copolymerized onto a reactive polymer of ethylenically unsaturated monomers.

Although about 40 to about 80 parts of graft copolymer per hundred parts of vinyl chloride polymer can be used, it is preferred to use a range of about 50 to 70 parts.

DESCRIPTION OF THE INVENTION

The vinyl chloride polymers of this invention can be homopolymers of vinyl chloride or copolymers of vinyl chloride and other monomers copolymerizable therewith. Exemplary monomers include vinyl esters, such as, vinyl acetate, vinyl propionate, vinyl laurate, vinyl stearate, and the like; α-olefins, such as, ethylene, propylene, butylene, and the like; and alkyl acrylates, or methacrylates having up to 18 carbon atoms in the alkyl moiety. Preferred copolymers include vinyl chloride/vinyl acetate copolymers and vinyl chloride/ethylene copolymers. The vinyl chloride/vinyl acetate copolymers contain about 5 to about 20 weight percent of vinyl acetate copolymerized therein with a range of about 8 to about 15 percent by weight of vinyl acetate being particularly preferred. The preferred inherent viscosity of these vinyl chloride/vinyl acetate copolymers, which are known in the art, lies in a range of about 0.50 to about 0.54, although an inherent viscosity of about 0.47 to about 0.80 can also be used if desired. Vinyl chloride homopolymers, also known in the art, which can be used in the practice of this invention preferably have inherent viscosities in the range of about 0.5 to about 1.0 although those having values of 0.40 to about 1.4 can also be used if desired.

The vinyl chloride/ethylene copolymers employed preferably contain about 0.3 to about 1.9 percent by weight of ethylene copolymerized therein. These copolymers preferably have an inherent viscosity of about 0.6 to about 0.8 although copolymers outside this range can also be used.

Suitable lactones used for the preparation of the graft copolymers of this invention include delta-valerolactone, epsilon-caprolactone, zeta-enantholactone, eta-caprylactone, mono-methyl-delta-valerolactone, dimethyl-delta-valerolactones, treithyl-delta-valerolactones, and the like. The reactive polymer of ethylenically unsaturated monomers used as the backbone of these lactone graft copolymers are obtained by the addition polymerization of at least one ethylenically unsaturated monomer selected from monomers represented by the formulae:

I 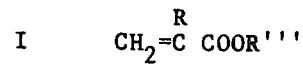

IA 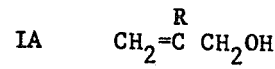

either alone or in a mixture with different polymerizable ethylenically unsaturated monomers containing the polymerizable

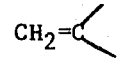

group. These reactive polymer backbones contain from about 0.1 mol percent to about a 100 mol percent of polymerized monomer represented by formula I or IA. The preferred backbone polymers are those containing from about 0.3 mol percent to about 10 mol percent of monomers I or IA polymerized therein. In formulae I and IA above R can be hydrogen, alkyl having from 1 to about 3 carbon atoms or $CH_2COOH$ and $R'''$ can be —OH, $OC_pH_{2p}$ OH in which p has a value of from 1 to about 5 or higher, $-C_pH_{2p}NH_2$, $-OC_pH_{2p}COOH$, $NH_pH_{2p}OH$, $-NHC_pH_{2p}NH_2$, $-NHC_pH_{2p}COOH$, $OC_pH_{2p}NHR''''$ or $NHC_pH_{2p}NHR''''$ where $R''''$ is alkyl having up to about 10 carbon atoms or more.

Illustrative of suitable vinyl monomers of Formula I and IA one can mention allyl alcohol, methallyl alcohol, ethallyl alcohol, acrylic acid, methacrylic acid, hydroxymethyl acrylate, hydroxymethyl methacrylate, 2-hydroxyethyl acrylate, 2-hydroxypropyl acrylate, 3-hydroxypropyl acrylate, 5-hydroxypentyl acrylate, 2-hydroxyethyl methacrylate, 2-hydroxyethyl ethacrylate, itaconic acid, aminomethyl acrylate, 2-aminoethyl acrylate, 2-aminoethyl methacrylate, 2-(N-methylamino)ethyl acrylate, 2-(N-methylamino)propyl acrylate, 2-(N-butylamino)ethyl methacrylate, 5-(N-methylamino)pentyl acrylate, 2-(N-decylamino)ethyl acrylate, 2-carboxyethyl acrylate, 2-carboxybutyl acrylate, 2-carboxyethyl acrylate, N-(2-hydroxypropyl) acrylamide, N-(aminoethyl)acrylamide, N-carboxymethylacrylamide, 2-(N-methylamino)ethyl acrylate, 2-(N-ethylaminopropyl)-acrylamide, and the like.

Illustrative of suitable polymerizable ethylenically unsaturated monomers containing the

group that are copolymerized with the vinyl monomers one can mention ethylene, propylene, the butenes and the pentenes, styrene, butadiene, isoprene, acrylonitrile, methacrylonitrile, methyl methacrylate, ethyl acrylate, vinyl chloride, vinylidene chloride, vinyl fluoride, vinyl acetate, vinyl butyrate, vinyl benzoate, isopropenyl methyl ketone, vinyl phenyl ketone, vinyl methyl ketone, alpha-chlorovinyl methyl ketone, divinyl sulfide, vinyl ethyl sulfide, vinyl p-tolyl sulfide, vinyl ethyl sulfone, vinyl sulfonic acid, 2-vinyl pyridine, bicyclo[2.2.1]hept-2-ene, 5-ethylidenebicyclo[2.2.1]hept-2-ene, bicyclo[2.2.1]hept-2,5-diene, decyl acrylate, octadecyl methacrylate, N,N-dimethylaminoethyl acrylate, acrylamide, methacrylamide, ethacrylamide, N-methylacrylamide, N-methylmethacrylamide, N-propylacrylamide, N-pentylmethacrylamide, acryloxyacetamide, 2-methacryloxypropionamide, N-methacryloxy acetamide, and the like. Any polymerizable ethylenically unsaturated monomer can be used; these are well known to those skilled in the art and the above listing is only exemplary thereof.

The polymerization and copolymerization of vinyl monomers and ethylenically unsaturated monomers by means of free radical polymerization initiators is well known. It is known that such polymerizations can be carried out in the absence of a solvent or in the presence of a solvent at temperatures of from about 40°C. to about 200°C. or higher. It is also known that the polymerizations can be carried out at subatmospheric, atmospheric or superatmospheric pressures. Among the known initiators used in the polymerization reaction are the per compounds such as di-t-butyl peroxide, t-butyl hydroperoxide, dicumyl peroxide, dibenzoyl peroxide, t-butyl peroxypivalate, lauroyl peroxide, acetyl peroxide, sodium persulfate, sodium perborate, sodium percarbonate, diisopropyl peroxydicarbonate, azobisisobutylronitrile, and the like.

Illustrative of suitable reactive polymers one can mention poly(methyl methacrylate/2-hydroxyethyl methacrylate), poly(methyl methacrylate/2-hydroxypropyl methacrylate), poly(ethylene/acrylic acid), poly(styrene/2-hydroxyethyl acrylate), poly(vinyl chloride/methacrylic acid), poly(acrylic acid/2-hydroxyethyl acrylate), poly(vinyl acetate/2-hydroxyethyl methacrylate), poly(acrylonitrile/hydroxymethyl acrylate), poly(vinyl chloride/vinyl acetate/2-hydroxyethyl acrylate), poly(vinyl chloride/styrene/2-hydroxymethyl methacrylate), poly(vinyl acetate/2-aminoethyl acrylate), poly[vinyl chloride/2(N-methylamino)ethyl acrylate], poly(vinylidene chloride/2-hydroxypropyl acrylate), poly(vinyl acetate/2-aminopropyl acrylate), poly(hydroxymethyl acrylate), poly(5-hydroxypentyl methacrylate), poly(2-aminoethyl acrylate), poly[2-(N-methylamino)ethyl methacrylate], and the like. These reactive polymers are those, therefor, that contain in the polymer chain in polymerized form the unit:

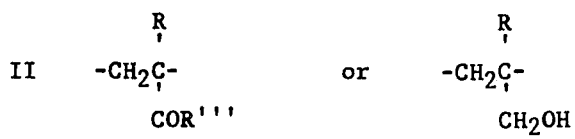

and this unit can be from 0.1 mole percent to 100 mol percent of the polymer chain. The reactive polymer can have a molecular weight as low as about 200 and can be as high as several million.

The lactone graft copolymers of this invention are produced by reacting a reactive polymer as hereinbefore described containing from 0.1 mol percent to 100 mol percent of polymerized units of Formula II in the molecule with a lactone or oxa-lactone using a known catalyst or activator for the lactone and oxa-lactone condensation reaction, such as stannous octoate, stannic octoate, sodium, potassium, sodium methoxide, potassium carbonate, magnesium carbonate, zinc borate, zinc oxide, lead silicate, cobaltous acetate, lead oxide, tetrabutyl titanate, dipropyl titanate, lithium hydride, lithium aluminum hydride, dibutyl zinc, aluminum triethoxide, triethyl aluminum, triisobutyl aluminum, and the like. Any of the catalysts or activators known to be useful for the condensation polymerizaton of lactones and oxa-lactones can be used. The concentration thereof can be from about 0.001 to about 5 weight percent based on the lactone or oxa-lactone charged; it is preferably, however, from about 0.01 to about 0.25 weight percent.

The graft polymerization is preferably carried out in the presence of an inert solvent that will dissolve the reactants and that will not interfere with the graft polymerization reaction. Illustrative thereof one can mention mineral spirits, benzene, toluene, xylene, octane, acetone, methyl ethyl ketone, and the like.

The graft polymerization is carried out at a temperature of from about 40°C. up to about 250°C. or higher. Any temperature can be used that does not decompose the reactants or the products or result in undesirable side reactions to any appreciable extent.

The reaction times will vary depending upon the particular reactants, the particular catalyst, the pressure, the temperature, the size of the batch and similar variables. This is known to those familar with graft polymerization reactions and any time can be selected to obtain the desired graft copolymer product.

The amount of lactone that can be graft polymerized to the reactive polymer can be from about 0.1 to 50 times the weight of the reactive polymer; larger amounts can be used if desired. The preferred graft copolymers are those produced when the lactone or oxa-lactone is from about 0.5 to about 10 times the weight of the reactive polymer.

Conventional vinyl chloride resin heat stabilizers well known to those skilled in art can be used in the insulation formulations of this invention in amounts ranging from about 1 to about 20 parts by weight per hundred parts of vinyl chloride polymer. These stabilizers include the many organometallic salts of lead, barium, cadmium, zinc and tin. Organo lead salts or mixtures of barium salts with lead salts or cadmium salts are preferred.

If desired, fillers can also be used in the insulation formulations such as calcined clay (aluminum silicate), calcium carbonate, silica, carbon black, titania and the like. Clay and calcium carbonate are preferred in this invention. Concentrations of about 5 to 15 parts by weight per hundred parts of vinyl chloride polymer are preferred although as high as 100 parts of filler can be used.

As will be appreciated by those skilled in the art other additives can also be used in these insulation formulations such as stearic acid as a lubricant processing aid, antimony trioxide as a flame retardant, dyes for color coding, and the like.

The components of the insulation formulation can be blended in commercial mixing equipment such as heated two-roll mills, Banbury mixers and the like. de The invention is further described in the Examples which follow. All parts and percentages are by weight An Instron Tester was programmed and modified so that the cross-arm moved the insulated conductor wire samples back and forth under a chisel at the rate of 100 cycles per minute. Thus the chisel scraped the wire samples 200 times per minute. The number of scrapes required for the chisel to scrape through the insulation to the conductor wire was measured using a low voltage electrical circuit as an indicator of contact between chisel and conductor.

A series of samples were prepared to test the efficiency of various insulation compositions in the above described test. These compositions are delineated in Table 1 below together with a description of the wire samples and the results of the abrasion test given in scrapes required to penetrate the insulation. These data presented in Table 1 below demonstrate the significant improvement in abrasion resistance obtained using polyvinyl chloride resin compositions containing as the lactone graft copolymer additive a graft of 77 percent poly(epsilon-caprolactone) onto a copolymer of 22.5 percent styrene and 0.5 percent hydroxyethyl methacrylate. It should be noted that all the conventional polyvinyl chloride insulated wire samples, that is, samples A, B, C and E endured only 350 or less scrapes. Only the samples containing the poly (ε-caprolactone) grafted onto a styrene/2-hydroxyethyl methacrylate copolymer insulation composition approached the abrasion values obtained with the nylon jacketed polyvinyl chloride composition.

TABLE 1

| SAMPLE | A | B | C | D | E | F | G |
|---|---|---|---|---|---|---|---|
| Insulation Composition | | | | | | | |
| Poly(vinyl chloride) Resin[a] | 100 | 100 | 100 | 100 | 100 | 100 | 100 |
| 2-Ethylhexylisodecyl phthalate | 39 | — | — | — | — | — | — |
| Di-isodecyl phthalate | — | 48 | — | — | — | — | — |
| Tri-isononyltrimellitate | — | — | — | 44 | 44 | — | — |
| Di-pentaerythritol valerate pelargonate | — | — | 44 | — | — | — | — |
| Aromatic hydrocarbon[b] | — | 12 | — | — | — | — | — |
| Organo lead stabilizer | — | — | 10 | 6 | 6 | — | — |
| Mixed organo barium and cadmium stabilizer | — | 3 | — | — | — | 6 | 6 |
| Calcined clay | 12 | 10 | 15 | 10 | 10 | 10 | 10 |
| Calcium carbonate | 15 | 45 | — | 8 | 8 | 5 | 5 |
| Mixed organo barium lead stabilizer | 2 | — | — | — | — | — | — |
| Poly(caprolactone) graft[c] copolymer | — | — | — | — | — | 40 | 60 |
| Description of Samples | | | | | | | |
| Conductor size, AWG | 14 | 14 | 14 | 14 | 14 | 14 | 14 |
| Insulation thickness, inches | 0.031 | 0.031 | 0.020 | 0.016 | 0.016 | 0.020 | 0.020 |
| Nylon jacket thickness, in. | None | None | None | 0.004 | None | None | None |
| Abrasion Test | | | | | | | |
| Scrapes required to penetrate insulation | 350 | 50 | 120 | 1530 | 130 | 1060 | 1020 |

[a] Vinyl chloride homopolymer having an inherent viscosity of 0.78 when measured as a 0.2 g. solution in cyclohexanone at 25°C. (ASTM D-1243).
[b] A mixture of aromatic hydrocarbons available under the tradename Escoflex 998.
[c] Graft copolymer of 77% poly( -caprolactone) onto a coplymer of 22.5% styrene and 0.5% 2-hydroxyethyl methacrylate.

unless otherwise specified.

EXAMPLE 1

The abrasion resistance of various insulate wire and cable samples was evaluated using the apparatus delineated below.

EXAMPLE 2

In order to determine the relative oil and solvent resistance of the various insulation compositions tested above, they were subjected to immersion studies in perchloroethylene and hexane. The percent weight change indicated the superior resistance of the compositions containing the poly(epsilon-caprolactone) graft copolymers over the other compositions. In Table 2 it can be seen that the negative weight change is an indication that the plasticizer had extracted from the sampel and is undesirable. It may be noted that the phthalate and FLEXOL R (available from UNION CARBIDE CORPORATION) are particularly efficient in undergoing a high degree of extraction.

These data further demonstrate the outstanding resistance of the new system described herein to attack by oils and fuels.

EXAMPLE 4

When Example 1 is repeated using a graft copolymer of epsilon-caprolactone grafted onto a backbone of a copolymer of methyl methacrylate and 2-hydroxyethyl methacrylate as the plasticizer, comparable results are obtained.

Although the invention has been described in its preferred form with a certain degree of particularity, it is understood that the present disclosure has been made only by way of example, and that numerous changes can be made without departing from the spirit and the scope of the invention.

What is claimed is:

1. Wire and cable insulation having enhanced abrasion, oil and solvent resistance comprising:
   1. A normally solid vinyl chloride polymer containing at least about 80 percent by weight of vinyl chloride polymerized therein and from 0 to about 20 percent by weight of an ethylenically unsaturated comonomer capable of copolymerizing with vinyl chloride; and
   2. about 40 to about 80 parts by weight per hundred parts of vinyl chloride polymer of a graft copolymer of a lactone having the formula:

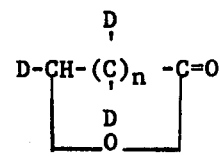

wherein $n$ is an integer having values of from about 3 to about 6 wherein at least $n+2$ D's are hydrogen and wherein the remaining D's are lower alkyl groups having up to about 8 carbon atoms, said lactone being graft polymerized onto a reactive organic polymer backbone of ethylenically unsaturated monomers, said polymer backbone containing from about 0.1 mol percent to about 100 mol percent of polymerized monomer selected from monomers represented by the formulae:

TABLE 2

| Sample | A' | B' | C' | D' | E' | F' | G' |
|---|---|---|---|---|---|---|---|
| Poly(vinyl chloride)Resin[a] | 100 | 100 | 100 | 100 | 100 | 100 | 100 |
| Poly(caprolactone) graft copolymer(c) | 47 | 67 | 97 | — | — | — | — |
| Di-2-ethylhexyl phthalate | — | — | — | 47 | — | — | — |
| FLEXOL R4M[d] | — | — | — | — | 47 | 67 | 97 |
| Mixed organo barium and cadmium stabilizer | 1.5 | 1.5 | 1.5 | 1.5 | 1.5 | 1.5 | 1.5 |
| Stearic acid | 0.3 | 0.3 | 0.3 | 0.3 | 0.3 | 0.3 | 0.3 |
| Epoxidized soybean oil | 3.0 | 3.0 | 3.0 | 3.0 | 3.0 | 3.0 | 3.0 |
| Immersion in Perchloroethylene 24 hrs. at 23°C | | | | | | | |
| % Weight Change | +3.6 | +1.8 | +1.2 | −18.9 | −12.2 | −20.8 | −31.6 |
| Immersion in Hexane 24 hrs. at 23°C | | | | | | | |
| % Weight Change | +1.1 | −0.3 | −0.3 | −21.8 | −1.4 | −6.0 | −11.4 |

[a] Defined in Table 1
[c] graft copolymer of 77% poly (ε-caprolactone) grafted onto a copolymer of 22.5% styrene and 0.5% 2-hydroxy-ethyl metacrylate.
[d] R4M is a liquid polyester prepared using phthalic anhydride ε-caprolactone, propylene glycol and a normal primary alcohol mixture containing 12 carbon atoms.

EXAMPLE 3

Sections of copper wire insulated with Sample G in Example 1 were exposed to ASTM No. 2 oil and gasoline for varying periods of time. The change in mechanical properties during immersion was used as a measure of degree of attack of the oil or gasoline upon the insulation. For comparison as a control a polyvinyl chloride insulated wire plasticized with conventional phthalate plasticizers rather than the poly(epsilon-caprolactone) graft copolymer plasticizers was also included. The results are shown in Table 3.

The data in Table 3 indicated the outstanding resistance of the polyvinyl chloride insulation plasticized with poly(epsilon-caprolactone) graft copolymerized onto a styrene-2-hydroxyethyl methacrylate backbone.

Table 3

| Sample | A'' | B'' |
|---|---|---|
| Formulation | | |
| Poly(vinyl chloride)Resin[a] | 100 | 100 |
| Poly(caprolactone/styrene)Plasticizer | 60 | — |
| Di-isodecyl phthalate | — | 3 |
| Tri-2-ethylhexyl trimellitate | — | 40 |
| Mixed n-dodecyl and n-tridecyl phthalates | 5 | 15 |
| Wet Ground CaCO₃ | 10 | 15 |
| Calcined clay | — | 5 |
| Dibasic lead phthalate stabilizer | 6 | — |
| Mixed organo barfum cadmium stabilizer | — | 10 |
| Physical Properties* | | |
| Original Tensile Strength, psi | 2790 | 2640 |
| Original Elongation, % | 305 | 203 |
| After Immersion in ASTM No. 2 Oil 96 hrs. at 100°C | | |
| % Tensile Strength Retained | 101 | 170 |
| % Elongation Retained | 113 | 16 |
| After Immersion in Ethyl Gasoline 60 Days at 30°C | | |
| % Tensile Strength Retained | 47 | — |
| % Elongation Retained | 116 | — |

[a] Defined in Table 1
*Insulated wire samples - No. 14 AWG copper conductor with 0.016–0.020 inch wall thickness of insulation

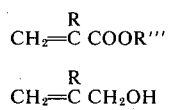

R being hydrogen, alkyl having from 1 to about 3 carbon atoms or $CH_2COOH$ and $R'''$ being $-OH$, $OC_pH_{2p}OH$ in which $p$ has a value of from 1 to about 5 or higher, $-C_pH_{2p}NH_2$, $-OC_pH_{2p}COOH$, $-NH_pH_{2p}OH$, $-NHC_pH_{2p}NH_2$, $-NHC_pH_{2p}COOH$, $-OC_pH_{2p}NHR''''$ or $-NHC_pH_{2p}NHR''''$ where $R''''$ is alkyl having up to about 10 carbon atoms or more.

2. Insulation claimed in claim 1 wherein the lactone of the graft copolymer is epsilon-caprolactone.

3. Insulation claimed in claim 2 wherein epsiloncaprolactone is grafted onto a reactive copolymer backbone of styrene and 2-hydroxyethyl methacrylate.

4. Insulation claimed in claim 1 wherein the normally solid vinyl chloride polymer is a homopolymer of vinyl chloride.

5. Insulation claimed in claim 1 wherein the normally solid vinyl chloride polymer is a copolymer of vinyl chloride and vinyl acetate.

6. Insulation claimed in claim 5 wherein the normally solid vinyl chloride polymer contains about 5 percent to about 20 percent by weight of vinyl acetate copolymerized therein.

7. Insulation claimed in claim 1 wherein the normally solid vinyl chloride polymer is a copolymer of vinyl chloride and an alpha-olefin having 2 to about 4 carbon atoms.

8. Insulation claimed in claim 7 wherein the alphaolefin is ethylene.

9. Insulation claimed in claim 7 wherein the ethylene content of the copolymer is about 0.3 percent to about 1.9 percent by weight.

10. Insulation claimed in claim 7 wherein the alpha-olefin is propylene.

* * * * *